(12) United States Patent
Knoerle et al.

(10) Patent No.: US 6,694,004 B1
(45) Date of Patent: Feb. 17, 2004

(54) SYSTEM AND METHOD FOR SIMULTANEOUS RING SERVICE WITH CENTRALIZED SUBSCRIPTION DATA

(75) Inventors: Joseph Michael Knoerle, Atlanta, GA (US); Hong Nguyen, Atlanta, GA (US); Zeeman Zhang, Marietta, GA (US); Michael Griffiths, Duluth, GA (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 333 days.

(21) Appl. No.: 09/749,824

(22) Filed: Dec. 28, 2000

(51) Int. Cl.[7] .................................................. H04M 3/42

(52) U.S. Cl. ............................. 379/211.04; 379/221.11; 379/221.08

(58) Field of Search ........................ 379/211.04, 211.02

(56) References Cited

U.S. PATENT DOCUMENTS

| | | | |
|---|---|---|---|
| 5,206,901 A | * 4/1993 | Harlow et al. | ......... 379/211.04 |
| 5,701,301 A | 12/1997 | Weisser, Jr. | ................. 370/428 |
| 5,838,774 A | 11/1998 | Weisser, Jr. | ............... 379/92.02 |

\* cited by examiner

*Primary Examiner*—Harry S. Hong
*Assistant Examiner*—Karen Le
(74) *Attorney, Agent, or Firm*—Shaw Pittman LLP

(57) ABSTRACT

A system and method for providing simultaneous ringing service to a plurality of customer premises equipment. The method and system utilize a centralized database of subscriber information and a service node to make multiple outbound calls from the service node to multiple telephone lines assigned to a subscriber. The subscriber's telephone lines may include one or more wireless lines. Inbound calls to the subscriber's primary wireline are intercepted by the simultaneous ringing service and forwarded to the service node for processing.

23 Claims, 6 Drawing Sheets

SYSTEM AND METHOD FOR SIMULTANEOUS RING SERVICE WITH CENTRALIZED SUBSCRIPTION DATA

BACKGROUND

1. Field of the Invention

The present invention relates generally to telecommunications systems and services provided in an advanced intelligent network ("AIN") environment and more specifically to telecommunication systems for simultaneously ringing multiple subscriber lines when a single call is placed to a subscriber's primary line.

2. Background of the Invention

Multiple communications systems have become ubiquitous in today's society. It is not uncommon for individuals, referred to herein as "subscribers," to have more than one telephone system including both wireline telephones and wireless telephones. Subscribers' wireline telephones may or may not be co-located in the same building and the wireless telephones are, by design, highly mobile. This situation has resulted in a need for subscribers to maintain and distribute multiple telephone numbers which may be used to establish communication.

When a caller tries to reach a subscriber, the caller must dial the subscriber's first telephone number and wait to see if anyone answers the call. If the call goes unanswered, the caller must try the next number and again wait for an answer. This process must be repeated until one of the calls is answered or the caller has tried all of the subscriber's numbers without success. This situation can be frustrating for a caller because multiple telephone calls may have to be tried before successfully reaching the subscriber. Similarly, subscribers can be frustrated because the end result may be a missed call. Simultaneous ring services have been offered to solve this problem for subscribers having multiple telephone numbers.

In a simultaneous ring service, when a call is made to a subscriber's wireline ("primary line") telephone number, the service provides a ringing tone on the primary line and on designated secondary lines. Such a service connects the caller to whichever telephone line is answered first. As known in the art, such simultaneous ring services may be extended to ring many different lines, wired or wireless, at the same time or to ring a series of lines in rapid succession. For simplicity, the description of conventional simultaneous ring services and the system and service of the present invention will be generally directed to simultaneous ringing of only two telephone lines. One of ordinary skill in the art will recognize how such services can be adapted to ring more than two lines simultaneously.

Although such simultaneous ring services have solved the subscribers' problems, the implementation used in conventional services has resulted in further problems for the telephone service providers ("telcos"). Conventional simultaneous ring services are implemented using a service node ("SN") comprising the telco's customer subscription data as described in more detail below.

Conventional Simultaneous Ring Service

Caller 110 in FIG. 1 is the person attempting to reach subscriber 112, a customer of telco 128. Caller 110 has telephone line 111. As known in the art, caller 110 could also be a customer of telco 128, or, caller 110 could be a foreign customer connecting through inter-exchange carrier ("IXC") 114 as shown in FIG. 1. In the schematic diagram shown in FIG. 1, when caller 110 places a call to subscriber 112's primary line (i.e., wireline 113) the call hits a termination attempt trigger ("TAT") on service switching point ("SSP" or "switch") 115. In response to this trigger, SSP 115 sends a query to service control point ("SCP") 116 via signaling network 118. As known in the art, signaling network 118 is a packet switched network consisting of various network components, including, e.g., signaling transfer points ("STPs"), SSPs, SCPs and the like. Common Channel Signaling System Number 7 ("SS7") is a network protocol commonly used in signaling networks in North America, although other protocols may be implemented elsewhere or in the future. For the present invention, the specific signaling network protocol implemented is not important.

As known in the art, SCP 116 uses data stored in database 119 to formulate an appropriate answer to AIN queries it receives. Database 119 typically stores a plurality of records associated with each subscriber of the various services provided by the particular SCP. In the case of a conventional simultaneous ring service, database 119 includes the telephone numbers for the subscriber's primary line and designated secondary lines, including wireless line 122. The database further includes information regarding the type of line used for each secondary line (i.e., whether the lines are wirelines or wireless lines). In response to the query from SSP 115, SCP 116 first checks database 119 to see if the calling party number corresponds to one of the subscriber's designated secondary lines. If a match is made, SCP 116 instructs SSP 115 to continue with normal call processing, i.e., wireline 113 rings if it is available or caller 110 is provided a busy signal if wireline 113 is busy. If a match is not made, SCP 116 directs SSP 115 to forward the call to SN 124 for further call processing. As known in the art, SN 124 could be served by the same switch as the subscriber, or could be served by a different switch. In FIG. 1, SN 124 is served by a different switch, SSP 125, via PRI trunk 126.

As shown in FIG. 1, in conventional simultaneous ring services SN 124 uses database 127 to store a plurality of records associated with subscriber of the service. Just as with database 119 (on SCP 116) database 127 (on SN 124) stores telephone numbers for the subscriber's primary and secondary lines and type information for the secondary lines. As described above, SSP 115 forwards the call the SN 124 for further call processing. SN 124 uses the subscriber's primary line telephone number, contained in the redirecting party number field of the call setup message, to identify the subscriber being called. SN 124 looks up the subscriber's secondary numbers in database 127 and initiates calls to each secondary number as well as to the primary number. SN 124 prioritizes and spaces these calls as necessary if any of the secondary lines are wireless lines. As soon as one of these calls is answered, SN 124 connects caller 110 to the answered line and ends the unanswered calls. As discussed above, this conventional simultaneous ring service provides the functionality needed from the subscriber's and the caller's point of view. However, the conventional implementation described above is not efficient for the telco providing the service.

As known in the art service nodes as very expensive systems and are generally for specific applications. If the load on a particular service node is heavy, multiple service nodes may be required to accommodate an application. Because conventional implementation requires subscription data to be stored on a service node, telco 128 must maintain multiple databases on multiple network nodes. Moreover, the information in these databases is duplicative of the information already needed to be stored in the service control point as described above. A need therefore exists for a more efficient system and method for providing simultaneous ring services for subscribers.

SUMMARY OF THE INVENTION

The present invention provides a system and method for providing simultaneous ringing on multiple subscriber telephone lines using a centralized database for storing the information related to the subscriber's lines. The database is stored on a centralized AIN node, usually a service control point, and it includes the telephone numbers for a subscriber's primary line and one or more secondary lines. When a caller places a call to the subscriber's primary line, a trigger is encountered at the switch serving the subscriber's primary line. In response to the trigger, the subscriber's switch queries the service control point for call processing instructions. In response to this query, the service control point instructs the subscriber's switch to forward the call to a service node. In one embodiment, the service control inserts a code indicating the quantity of wireless lines and the total quantity of secondary lines designated by the subscriber. When the service node receives the forwarded call, it initiates a series of outbound calls to the subscriber's primary and secondary lines as described below.

Because the service node in the present invention does not have any local subscription data, it relies on the service control point to provide the information from its centralized database. To accomplish this, the service node places a call to the subscriber's primary line number, which it retrieves from the information provided within the original forwarded call. In placing this call, the service node inserts a special identification code into the redirecting party number field of the call setup message. This identification code is used to indicate which of the subscriber's designated telephone number is being requested, i.e., whether the first, second, third, etc. telephone number is needed. In one embodiment of the present invention, the switch serving the service node is provisioned with an appropriate trigger that temporarily suspends this call while the switch queries the service control point for call processing instructions. In a second embodiment of the present invention, the trigger on the subscriber's line is used to initiate the query.

The service control point uses the subscriber's primary telephone number (found in the called party number field) and the identification code (found in the redirecting party number field) to retrieve the corresponding secondary telephone number from its database. In one embodiment, the service control point provides telephone numbers corresponding to wireless secondary lines prior to providing wireline numbers. In this manner, the service node spaces the calls out to ensure proper timing for the calls as described in more detail below.

The service control point inserts the retrieved secondary telephone number into the called party number field and instructs the switch to continue call processing using the telephone number provided. The service node repeats these steps for each telephone number in the subscriber's designated list of lines to ring via this service. If one of the called lines is answered, the service node drops the other calls and stops initiating new calls. The caller is then connected to the answered call. If none of the called lines are answered, the service node drops all of the calls. In one embodiment of the present invention, the service node provides an appropriate announcement to the caller.

In one embodiment of the present invention, the simultaneous ringing service performs many additional functions such as checking the status of each line prior to placing the simultaneous calls, or checking to see if the calling party number is one of the subscriber's designated lines. Further, the service can provide an administration system that allows subscribers to change the status of their subscription and to add or delete lines from the database. Finally, in one embodiment of the present invention, a heartbeat call from the service node to the service control point is provided for tracking the availability of the service node for processing simultaneous ring services.

DETAILED DESCRIPTION OF THE INVENTION

Figure 1:
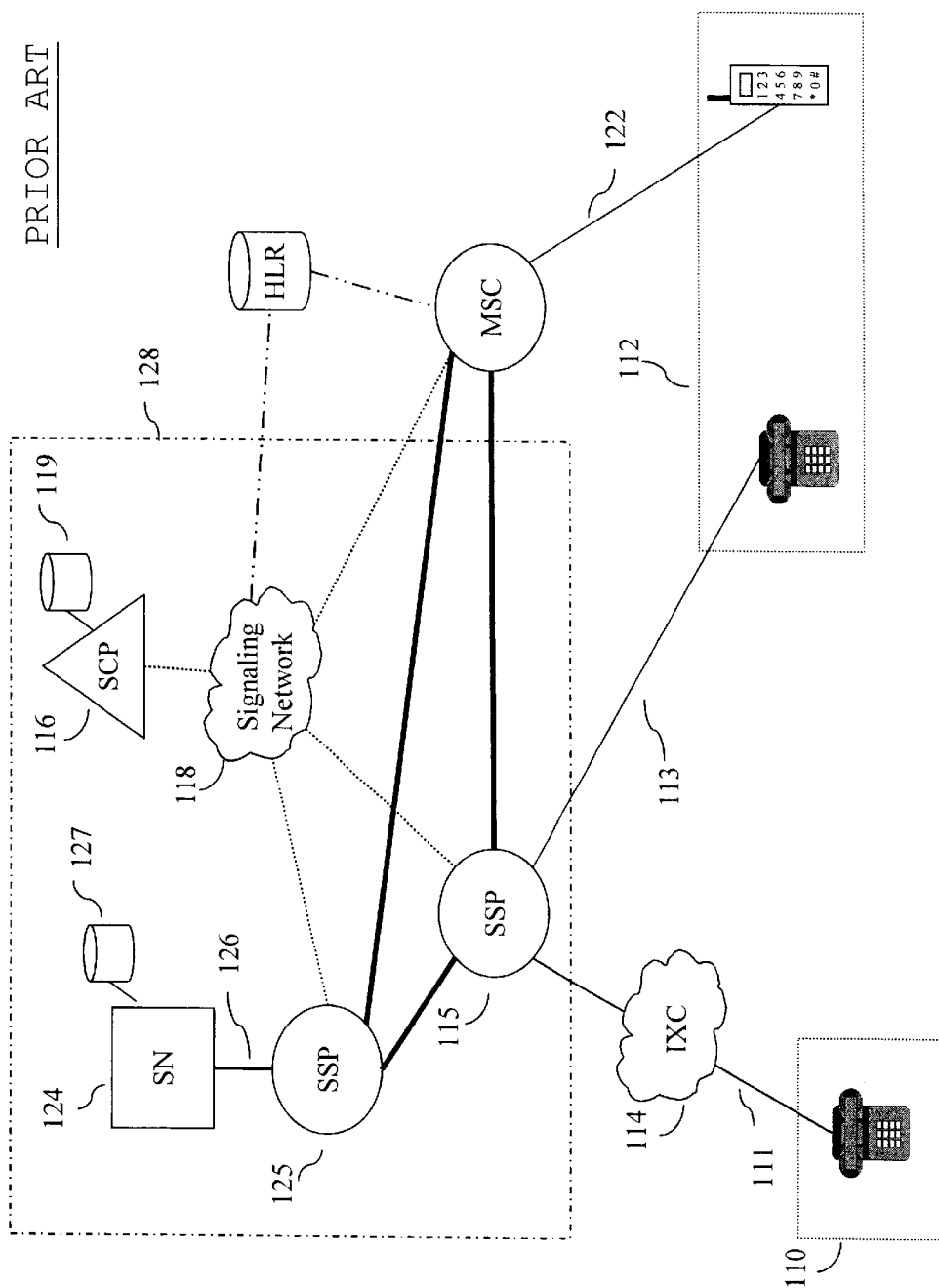
FIG. 1 is a schematic diagram showing a prior art system for providing simultaneous ringing service.
Figure 2:
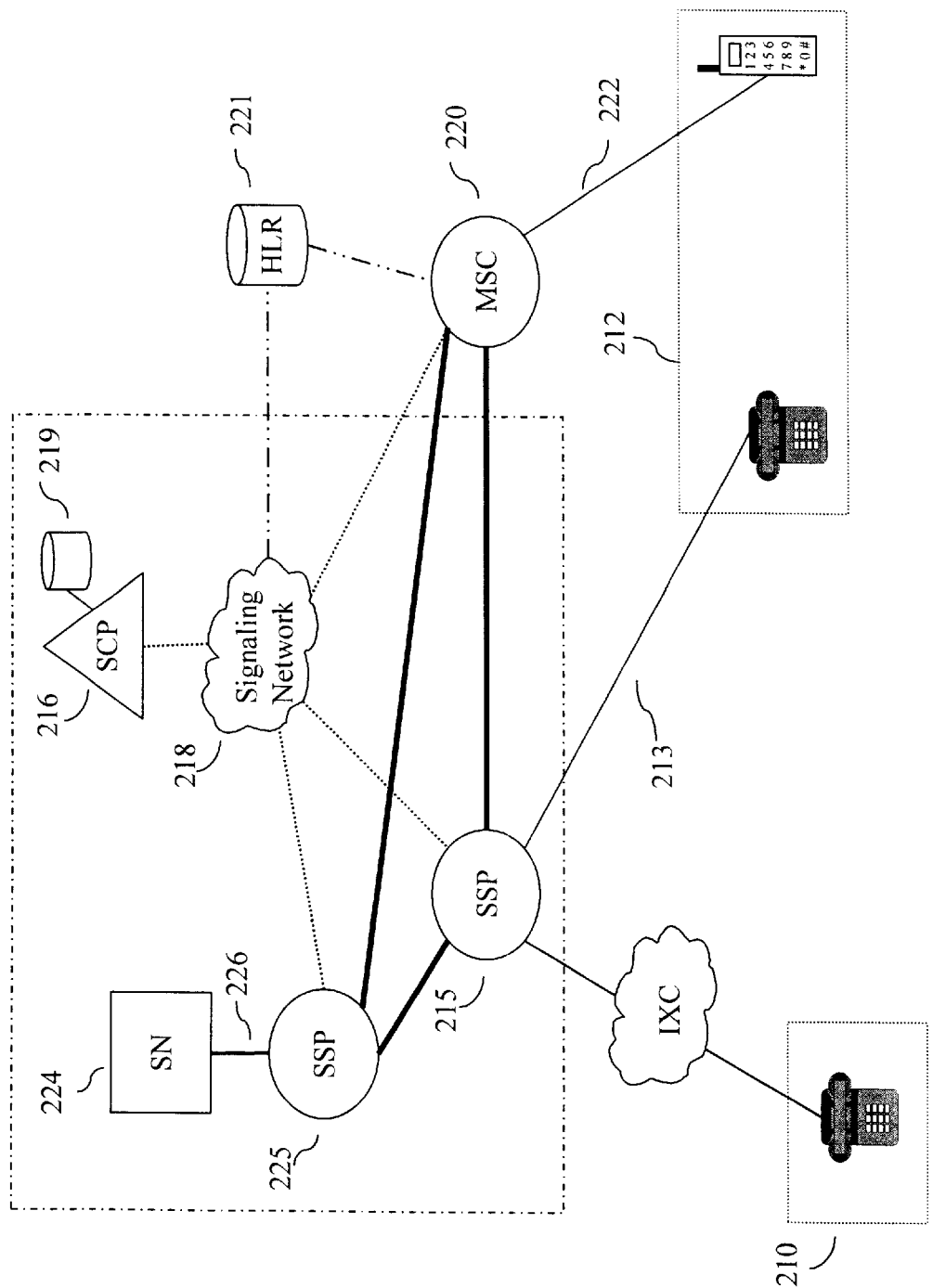
FIG. 2 is a schematic diagram showing a general system architecture used in an embodiment of the present invention.

The present invention is best described by providing a detailed description of the call flow in a first embodiment of the present invention. The following description also provides call flows and descriptions for alternative embodiments as noted. FIG. 2 shows the AIN architecture used in the first and alternative embodiments of the present invention and referenced in the call flow descriptions below. An administration system allowing the subscriber to manage his or her simultaneous ringing service is described. Finally, an embodiment for including status messages sent between the SN and the SCP is described.

Call Flow

Figure 3A:
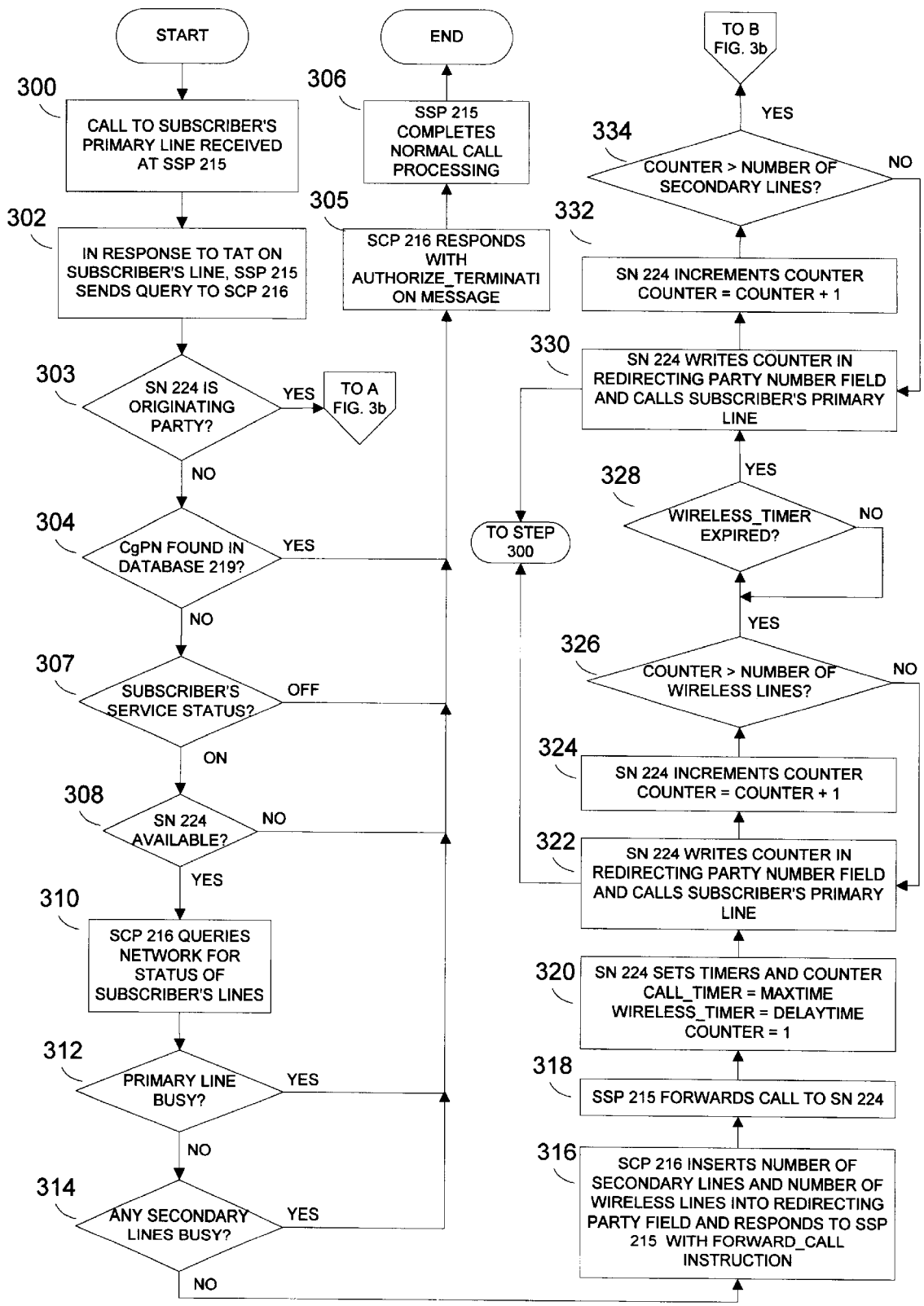
FIGS. 3a and 3b are flow charts showing the call flow for a first embodiment of the present invention.
Figure 3B:
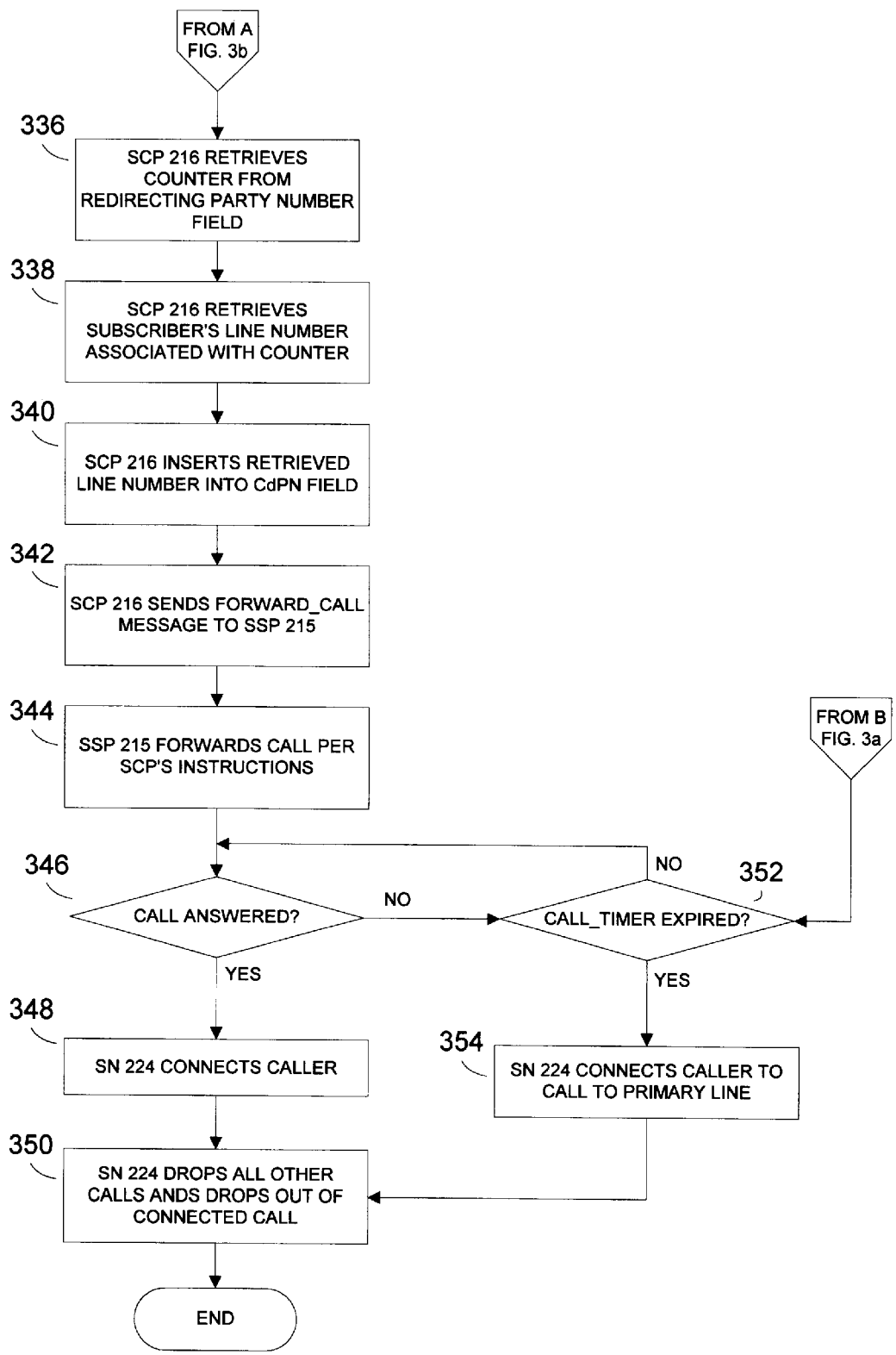

The call flow used in the first embodiment of the present invention is detailed in FIGS. 3a and 3b. Caller 210 initiates the simultaneous ring service by dialing the telephone number for subscriber 212's primary line, wireline 213. In step 300, the call is received by SSP 215. In step 302, a TAT on wireline 213 at SSP 215 causes SSP 215 to send an AIN query message to SCP 216. As described above, query and response messages are sent between AIN nodes via signaling network 218. In response to the query, SCP 216 provides call processing instructions carrying out the simultaneous ring service as described below.

In step 303, SCP 216 checks to see if the call originated at the service node. In one embodiment, SCP 216 accomplishes this step by checking the originating number field for the call. If the originating number corresponds to SN 224, then SCP 216 recognizes that this call is already being handled by the simultaneous ring service. In another embodiment, SCP 216 checks the redirecting party number field to see if a service node has entered any special codes in the field. If SCP 216 determines that the call originated from a service node, the call flow continues at point A in FIG. 3b, described in later sections, below. If the originating party number is not associated with SN 224 the call flow moves on to step 304. In step 304, SCP 216 checks the calling party number ("CgPN") field in the query message to determine whether or not the caller is calling from one of the subscriber's designated numbers. SCP 216 looks up the called party number ("CdPN"), i.e., the subscriber's primary number in database 219 to see if the CgPN is associated with it. If the CgPN is found in database 219, there is no need to ring the wireless number since the subscriber is using one of the secondary lines to call home and the call flow moves on to step 305 where SCP 216 provides an Authorize_Termination response to SSP 215. In step 306, SSP 215 completes normal call process, i.e., caller 210 receives a ringing tone, a busy tone, or other normal call termination messages.

If the CgPN was not found in database 219, the call flow moves on to step 307 where SCP 216 checks the current status of the subscriber's simultaneous ring service. If the subscriber's service is turned off, the call flow moves on to step 305 and SCP 216 sends an Authorize_Termination response and normal call processing continues as described above. If the subscriber's simultaneous ring service is on, the call flow moves on to step 308 where SCP 216 checks to see if SN 224 is available. If SN 224 is not available, the simultaneous ring service will not be provided and the call flow moves on to step 305 as described above.

In step 310 SCP 216 queries the network to determine the status of subscriber 212's telephone lines. If, in step 312, the subscriber's primary line, i.e., wireline 213, is busy, there is no need for simultaneous ringing because the subscriber is known to be at that location. In this case, the call flow moves on to step 305 for normal call processing as described above. Similarly, if, in step 314, any of the subscriber's secondary lines are busy there is no need for simultaneous ringing so the call flow moves on to step 305 for normal call processing. Otherwise, if the subscribers primary line and all of the secondary lines are available the call flow moves on to step 316.

In step 316 SCP 216 responds to the query with a Forward_Call message instructing SSP 215 to route the call to SN 224. As known in the art, the redirecting party number field in the Forward_Call message is fifteen characters long and would contain the subscriber's primary number (i.e., the original CgPN) with leading zeros or blanks to fill the first five characters. In step 316, SCP 216 modifies the redirecting party number by appending a code to indicate the quantity of wireless lines and total quantity of secondary lines (including the subscriber's primary line). In the first embodiment of the present invention, the code is appended to the beginning of redirecting party number field of the Forward_Call response message. For example, if the subscriber has designated two different wireless lines and two other wirelines to receive simultaneous ringing, SCP 216 appends a code such as "23" to the redirecting party number field. If, e.g., the subscriber's primary line number is "2122223333" the redirecting party number field would be "230002122223333." In step 318, SSP 215 follows SCP 216's instructions and forwards the call to SN 224 with the redirecting party number field as modified by SCP 216.

In step 320, SN 224 receives the call and sets appropriate timers and a call counter. The timers include a Call_Timer and a Wireless_Timer. The Call_Timer is set to the maximum time ("MaxTime") allowed for the simultaneous ring service to operate. If, as described below, the Call_Timer expires before any of the secondary lines are answered, caller 210's call is connected to a call to the subscriber's primary line. In the preferred embodiment, MaxTime is 60 seconds. The Wireless_Timer is used to compensate for delays ("DelayTime") inherent in establishing a call to a wireless line. SN 224 places calls to each of the wireless lines designated by the subscriber and waits for the Wireless_Timer to expire before placing calls to the wirelines. In the first embodiment, DelayTime is four seconds. The call counter ("Counter") can be used to keep track of how many calls SN 224 has placed. Counter is initialized to "1" in step 318. After step 320, SN 224 initiates a series of telephone calls to the subscriber's primary and secondary lines as described below.

In step 322 SN 224 initiates a call to subscriber 212's primary line (wireline 213) and writes the value of Counter in the redirecting party number field of the call setup message. For example, if Counter has a value of "1" SN 224 writes "1111111111" in the redirecting party number field. This code will be used by SCP 216 in later steps to retrieve the subscriber's first telephone number from database 219. Similarly, if Counter has a value of "4" SN 224 writes "4444444444" in the redirecting party number field and SCP 216 will retrieve the fourth telephone number from the database. Because this call is place to the subscriber's primary line, the call flow branches back to step 300 as indicated in FIG. 3a. The TAT on wireline 213 at SSP 215 is again encountered in step 300, and SSP 215 sends another query to SCP 216 requesting call processing instructions in step 302. This time, however, in step 303, the originating party number is that of SN 224 so the call flow moves on to point A in FIG. 3b. At the same time as this branch of the call flow is being executed, SN 224 continues on to step 324 where it increments Counter by one.

In step 326 SN 224 compares Counter with the quantity of wireless lines associated with subscriber 212. Recall that SN 224 previously received this information from SCP 216 in step 316. If Counter is not greater than the quantity wireless lines then SN 224 returns to step 322 and places another call to the subscriber's primary line (wireline 213) as described above. This time, the current (i.e., as incremented in step 324) value of Counter is written in the redirecting party number field so that the next telephone number will be retrieved by SCP 216 in later steps. If, in step 326, Counter is greater than the quantity of wireless lines, the call flow moves on to step 328. Step 328 represents a waiting state. That is, even if SN 224 has already placed calls to each wireless line, it waits until Wireless_Timer has expired (i.e., DelayTime has passed) before moving on to step 330.

In step 330 SN 224 places another call to the subscriber's primary line (wireline 213) as described above. As described above, the current value of Counter is written in the redirecting party number field so that the next telephone number will be retrieved by SCP 216 in later steps. Again, call flow branches after SN 224 places the outbound call to the subscriber's primary line, and the process branches to step 300. Meanwhile, in step 332 SN 224 increments Counter again then moves on to step 334. In step 334, if Counter is greater than the total quantity of lines designated by the subscriber for simultaneous ring service, no more calls need to be placed and the process moves on to point B in FIG. 3b. If Counter is not greater than the total quantity of designated lines, SN 224 returns to step 330 to place another call to the subscriber's primary line as described above.

FIG. 3b picks up the call flow for calls placed from SN 224 to the subscriber's primary number. As described above in connection with steps 300–303, all such calls encounter the TAT on the subscriber's line at SSP 215 and in response to the TAT, SCP 216 recognizes that the call originated from SN 224. In step 336, SCP 216 retrieves the value of Counter from the redirecting party number field of the query message from SSP 215. In step 338, SCP 216 retrieves the appropriate telephone number to be called by looking up the subscriber's primary line number (obtained from the CgPN field) and retrieving the Nth designated number, where N corresponds to Counter.

In step 340 SCP 216 writes the retrieved telephone number in the CdPN field and responds to the query by instructing SSP 215 to forward the call to the new CdPN in step 342. In step 344, SCP 215 forwards the call to the designated telephone according to SCP 216's instructions. If the call is answered in step 346 SN 224 connects the caller in step 348. In step 350 SN 224 drops any other calls that are in progress and drops out of call between caller 210 and the answered line. If in step 346 the call has not been answered, the call flow moves on to step 352. In step 352, Call_Timer is checked to see if MaxTime has passed. If MaxTime has passed, SN 224 moves on to step 354 and connects the caller to the subscriber's primary line. Then, in step 350, SN 224 drops any other calls in progress and drops out of the connected call as described above. By connecting the caller to the primary line SN 224 ensures that caller 210 receives some form of call termination (i.e., a busy signal, ringing tone, etc.). In a second embodiment of the present invention, SN 224 could provide caller 210 with an announcement indicating that caller 212 is not available to take the call and forwards the call to a voice mail system. If, in step 352, Call_Timer has not expired then the call flow returns to step 346 to see if the call has been answered yet as described above.

Steps 336 and beyond are performed each time SN 224 places another outbound call to the subscriber's primary line. That is, each time SCP 216 receives a query and the originating node was SN 224, it looks up the next telephone number in subscriber 212's designated list of simultaneous ringing lines. The calls are ongoing concurrently, that is, SN 224 places multiple calls at the same time or in very rapid succession so that the calls to each designated number being attempted at roughly the same time. If any one of the calls is answered (i.e., in step 346) the call flow moves on to steps 348 and 350 for final call processing as described above. Similarly, if none of the calls are answered before the maximum call timer expires, the call flow moves on to steps 354 and 350 for final call processing.

In an alternative embodiment of the present invention, in step 320, SN 224 can provide an announcement to caller 210 such as "Please hold while your is being processed." The announcement could also provide other informative messages, e.g., advertising, or could play music while the simultaneous ring services tries to locate the subscriber. In this embodiment, step 352 can be modified so that SN 224 plays a message to the caller explaining that the subscriber could not be reached. The caller could also be provided an option to connect to the subscriber's primary line in which case step 352 as previously described is performed.

Figure 4A:
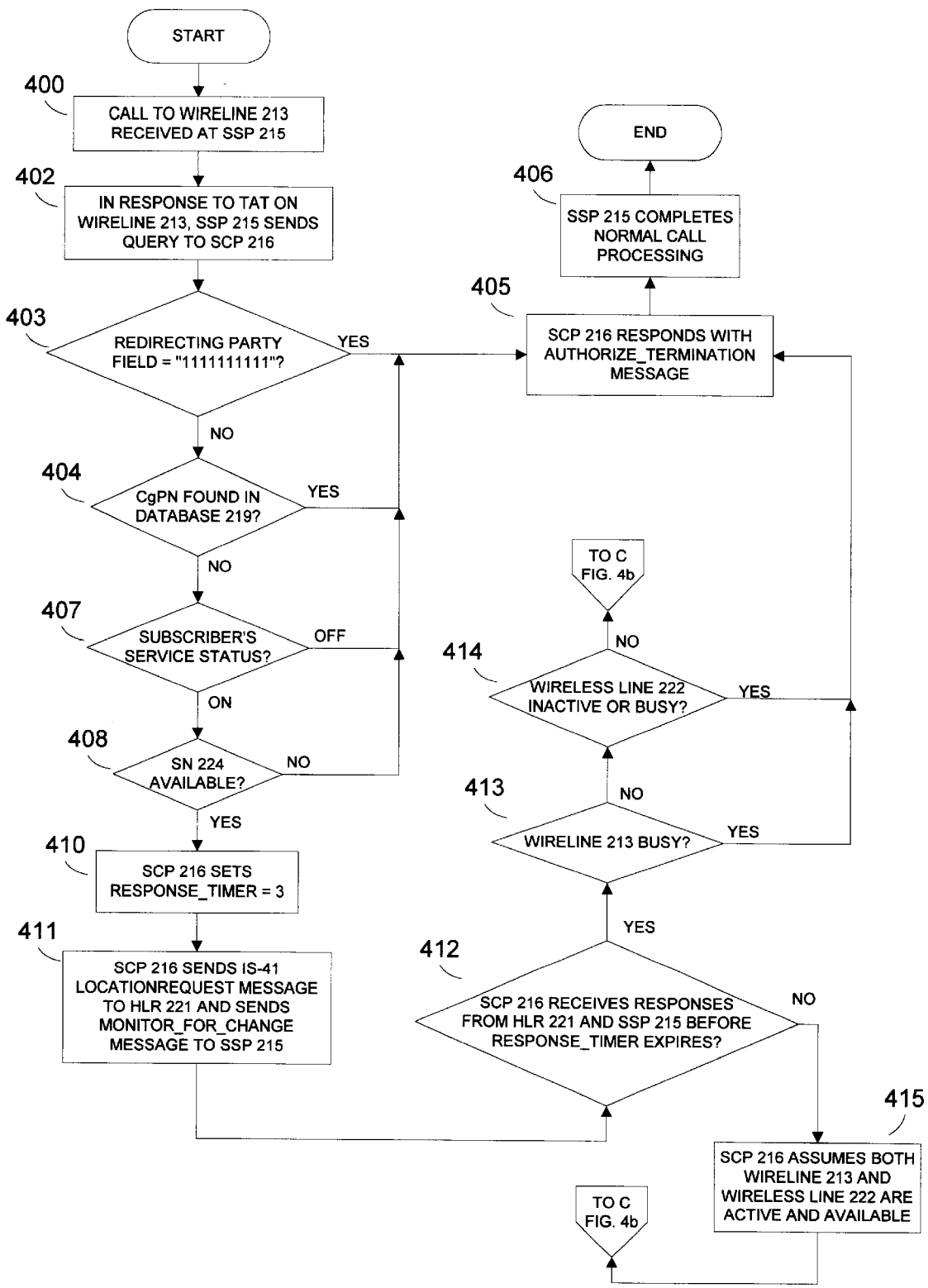
FIGS. 4a and 4b are flow charts showing the call flow for a second embodiment of the present invention.
Figure 4B:
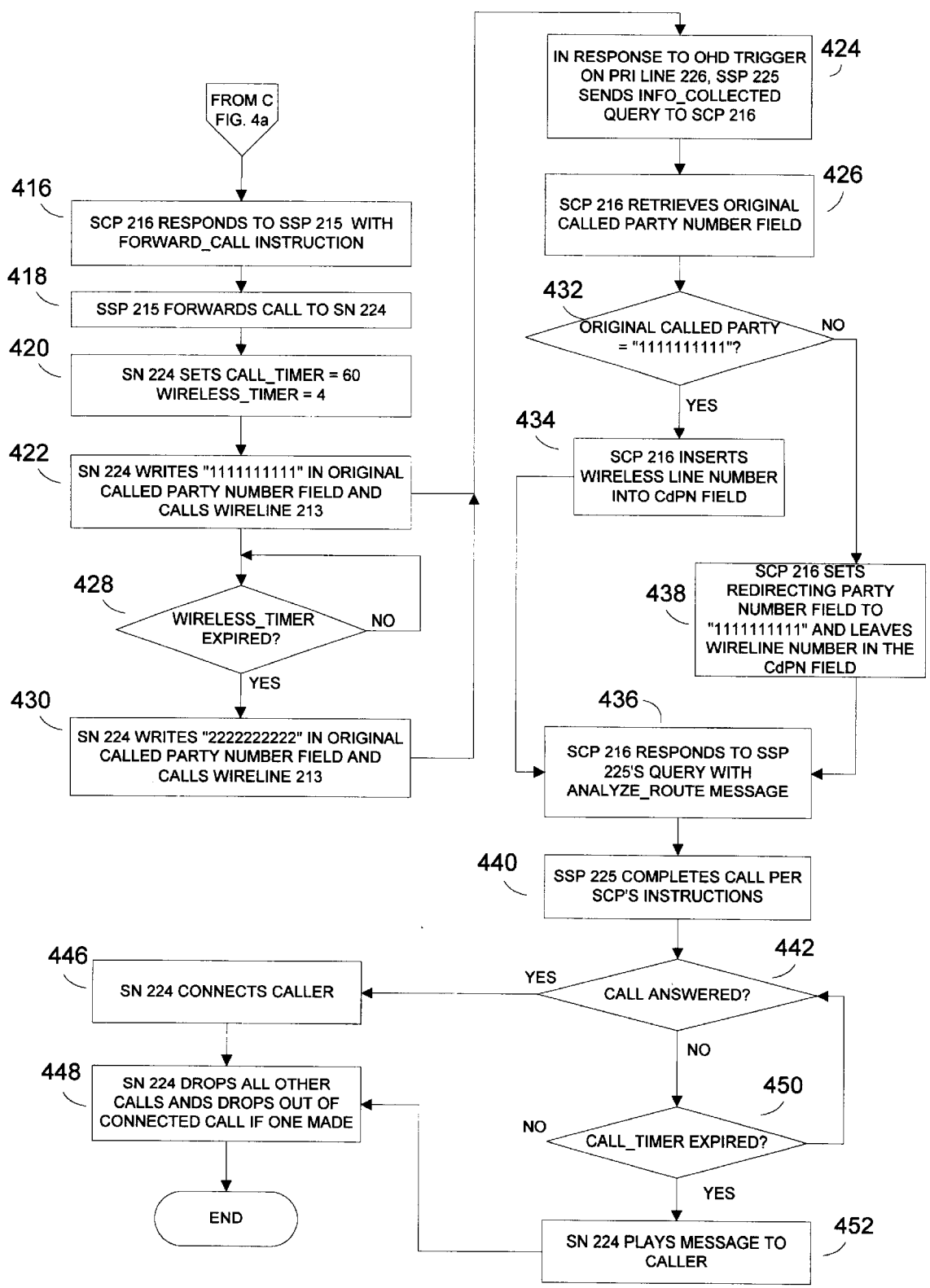

FIGS. 4a and 4b show the call flow associated with a second embodiment of the present invention. This embodiment is also used to provide a more specific example of the messages that may be passed between the various AIN nodes when providing simultaneous ring services according to the present invention. In this example, the simultaneous ring service is configured to provide simultaneous ringing only to the subscriber's primary line and one secondary line. One of ordinary skill in the art can adapt the steps described above in connection with the first embodiment if more than two lines will receive simultaneous ringing.

In steps 400 and 402 caller 210's call to wireline 213 encounters the TAT on the line and causes SSP 215 to send a Termination_Attempt query message to SCP 216. In steps 403 through 408, SCP 216 checks the CgPN, the subscriber's simultaneous ring subscription status, and the status of SN 224, as described previously in corresponding steps 303 through 308. Accordingly, if the call originated from SN 224 (i.e., for example "1111111111" is in the redirecting party number field in step 403) or the CgPN is in database 219 (step 404) or the subscription is turned off (step 407) or SN 224 is unavailable (step 408), SCP 216 responds to SSP 215 by sending an Authorize_Termination message (step 405) and normal call processing proceeds in step 406. Otherwise, in step 410 SCP 216 sets Response_Timer to three seconds to insure call processing continues even if it fails to determine the status of the subscriber's wireline and wireless line in steps 411 and 412.

In step 411, SCP 216 checks the status of the subscriber's primary and secondary lines by sending queries to network nodes responsible for each line. That is, SCP 216 sends a LocationRequest query message to HLR 221 and a Monitor_For_Change instruction to SSP 215. As known in the art, LocationRequest query message uses the IS-41 protocol. In response to this query, HLR 221 should send SCP 216 a LocationRequest Return Result message indicating whether wireless line 222 is active, busy or inactive. Similarly, SSP 215 should return a Status_Reported message indicating whether wireline 213 is active or busy. In step 412, SCP checks to see if the expected responses have been received before the Response_Timer expires. If so, call processing continues to step 413 where, if SSP 215 reports that wireline 213 is busy, SCP 216 determines that no simultaneous ringing is necessary. In this case, SCP 216 moves on to steps 405 and 406 and normal call processing is provided. Similarly, if wireless line 222 is either busy or inactive (as reported by HLR 221) SCP 216 determines that no simultaneous ringing is necessary and sends an Authorize_Termination message to SSP 215 (steps 405 and 406). Call processing continues after step 414 at point C in FIG. 4b, as described below.

If, in step 412, the Response_Timer has expired before receiving responses from either of HLR 221 or SSP 215,SCP 216 moves on to step 415. In step 415, SCP 216 assumes that both wireline 213 and wireless line 222 are available (i.e., active and not busy). Call processing continues after this step at point C in FIG. 4b.

Continuing on in step 416, SCP 216 responds to SSP 215 by sending a Forward_Call message to direct the call to SN 224. In this embodiment, the redirecting party number field is simply the subscriber's primary line number, i.e., the number originally dialed by caller 210. In step 418, SSP 215 complies with the service control point's instructions and forwards the call to SN 224. In step 420, SN 224 answers the call an sets the Call_Timer to 60 seconds and Wireless_Timer to four seconds. Alternatively, when SN 224 answers the call, it may play an announcement to caller 210 informing the caller that the simultaneous ring service is attempting to reach the subscriber before setting the timers as described. In an another variation of this embodiment, the caller may be offered an opportunity to skip the simultaneous ring service and the service node acts accordingly.

Once the timers have been set in step 420, SN 224 places an outbound call in step 422 to wireline 213 using the number retrieved from the redirecting party number field of the inbound call. Moreover, in step 422, SN 224 inserts the code "1111111111" into the original called party number field of the outbound call to identify this call as a request for the subscriber's wireless line telephone. After the Wireless_Timer has expired (step 428) SN 224 places a second outbound call to wireline 213 in step 430. This second call has the code "2222222222" in the original called party number field to identify it as a request to connect to the subscriber's wireline 213. Both of these outbound calls encounter a trigger on SSP 225, the switch service SN 224 as described below.

In this embodiment PRI trunk group 226 is provisioned with a Channel Setup PRI/Off-Hook Delayed ("OHD") trigger on SSP 225. Accordingly, when SN 224 originates any calls on the B channels of the PRI interface, the OHD trigger is encountered. In step 424, in response to the OHD trigger SSP 225 sends an Info_Collected query to SCP 216 for call processing instructions. In response to this query, SCP 216 returns an Analyze_Route response in step 436. Prior to sending this response, SCP 216 determines the appropriate calling parameters by examining the information provided by SN 224 in the call query message, as described below.

In this embodiment, the original called party number field indicates which call is being placed by SN 224. In step 426, SCP 216 retrieves the original called party number and determines which telephone number is required from database 219 in step 432. In this example, when the first outbound call from SN 224 encountered the trigger, the original called party number field contains "1111111111" and SCP 216 moves on to step 434. In step 434, SCP 216 inserts the telephone number for subscriber 212's wireless line 222 as indicated in database 219. The second outbound call from SN 224 does not contain "1111111111" in the original called party field (in this example the field contains "2222222222") so SCP 216 moves on to step 438. In step 438 SCP 216 sets the redirecting party number field to a code, such as e.g., "1111111111" and leaves the wireline telephone number in the called party field. This code in the redirecting party number field is used in step 403 to determine the appropriate response to the TAT on wireline 213 as described above.

Using the parameters as set in either steps 434 or 436, SCP 216 moves on the step 436 and sends the Analyze_Route response to SSP 225. In step 440, SSP 225 completes each call according to the instructions provided in SCP 216's response message. In step 442, SN 224 determines whether or not either telephone call has been answered. If so, SN 224 connects caller 210 to the answered call in step 446 and drops the unanswered in step 448. If neither call has been answered (in step 442) SN 224 checks to see if Call_Timer has expired. If not, SN 224 returns to step 442 and checks to see if one of the calls has been answered. Otherwise, SN 224 plays a message to caller 210 in step 452. The message could inform the caller that the subscriber could not be located or was not available to take the call. SN 224 then drops all of the calls is step 448 and the service is completed.

Using the Channel Setup PRI/OHD trigger in this embodiment allows SCP 216 to supply the wireless number to route the call and at the same time allows the caller's caller ID information to be displayed to the end-user. SN 224 provides the caller ID if it is "available" or marks the caller ID as "private/restricted" or "unavailable," as appropriate.

Service Activation/Deactivation Menu

In one embodiment, the subscriber can turn the simultaneous ring service on and off by dialing an administration number on a central office switch (not shown in FIG. 2). A TAT trigger is assigned to the administration number on that switch. When the subscriber's call reaches the switch, the TAT is encountered causing the switch to launch a query to SCP 216. SCP 216 looks up the calling party ID in database 219 to retrieve subscriber 212's information. If the calling party ID information is not delivered (e.g., the line is marked private), SCP 216 issues a Send_to_Resource message to the switch directing the switch to play an announcement and collect the end-user subscriber ID and personal identification number ("PIN"). The subscriber ID is the number for wireline 213 or some other unique number associated with subscriber 212.

An interactive menu is provided by the switch under SCP 216's direction via Send_To_Resource and Resource_Clear messages. The end-user may hear an announcement stating the status of the service such as "Your Simultaneous Ring service is now on." The menu allows the end-user to enable or disable the service as desired. In an alternate embodiment, a service node may be used to interact with the subscriber and the SCP instead of a switch. In this embodiment, the service node can be selected by the SCP in response to a TAT on the administration number at the switch. Thus, the programming logic for requesting information from the subscriber can be customized and placed on multiple service node to accommodate systems workloads.

Heart Beat Call

In one embodiment, SN 224 regularly communicates its status to SCP 216. SN 224 periodically calls a telephone number set up for this purpose. The periodic call is known as a "heartbeat" call because as long as SCP 216 receives a status message, it assumes that SN 224 is "alive," i.e., available to provide the simultaneous ring service. The interval between heart beat calls can be set as appropriate given the amount of congestion or other factors affecting performance of the SN. In one embodiment, the timer is set to 30 seconds. When the timer expires, SN 224 makes a PRI call by dialing the pre-defined heart beat number. SN 224 inserts various codes into the redirecting party number field to convey its status information to SCP 216. The status information conveyed includes the time interval indicating when SCP 216 should receive the next heartbeat call.

Because SN 224 uses the PRI lines, the PRI Channel Setup/OHD trigger is encountered at SSP 225. SSP 225 sends a query to SCP 216 which recognizes the call as a heartbeat call, based on the called party number field. SCP 216 retrieves the status information and updates SN 224's status in database 219 and returns an appropriate response message to SSP 225. In one embodiment, the response message is a Send_to_Resource message instructing SSP 225 to send a Release message to SN 224. When SN 224 receives this message, it resets the timer for the next heartbeat call and ends the call. Moreover, SCP 216 coordinates with its mated SCP (not shown in FIG. 2) via an X.25 interface. In this manner, either SCP can serve the simultaneous ring service without interruption.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What we claim is:

1. A method for providing simultaneous ringing on a plurality of telephone lines using a centralized subscription database, said method comprising:
   (a) populating the centralized subscription database with a plurality of telephone numbers associated with the plurality of telephone lines, wherein one of the plurality of telephone numbers is a primary telephone number;
   (b) forwarding a first call to the primary telephone number from a first switch to a service node;

(c) placing a second call to the primary telephone number from the service node, wherein the second call comprises a counter in a first field;

(d) inserting a calling party number selected from the centralized subscription database in response to the second call;

(e) completing the second call from the service node to the selected calling party number;

(f) incrementing the counter;

(g) connecting the first call to the second call if said second call is answered; and (h) repeating steps (c) through (g) for each telephone number in the centralized database.

2. The method of claim 1, further comprising the step of checking the status of each of the plurality of telephone lines.

3. The method of claim 1, wherein the first field is a redirecting party number field.

4. The method of claim 1, wherein the centralized subscription database is populated on a service control point.

5. The method of claim 4, further comprising the step of provisioning a trigger on a second switch wherein said trigger is provisioned for a line serving the service node; and wherein step (d) further comprises sending a query from the second switch to the service control point and selecting the calling party number from the centralized subscription database according to the primary telephone number and the counter.

6. The method of claim 1, further comprising the steps of provisioning a trigger on the first switch wherein said trigger is provisioned for a line serving the primary telephone number, and wherein step (b) further comprises the steps of receiving the first call at the first switch, and sending a query message from the first switch to a service control point in response to the first call, sending a response message from the service control point to the first switch wherein said response comprises a Forward_Call message and a telephone number for the service node.

7. A method for providing simultaneous ringing on a primary telephone line and a plurality of secondary telephone lines, said method comprising:

(a) populating a database on a service control point with plurality of telephone numbers comprising a primary telephone number and a plurality of secondary telephone numbers;

(b) provisioning on a first switch a trigger for the primary telephone line;

(c) receiving on the first switch a first call to the primary telephone line;

(d) sending a first query from the first switch to the service control point in response to the first call;

(e) checking the status of the primary telephone line and the plurality of secondary telephone lines;

(f) sending a first response message from the service control point to the first switch;

(g) connecting the first call to a service node in response to the first response message;

(h) initiating a second call to the primary telephone line from the service node, wherein said second call has an identification code in a redirecting party field;

(i) receiving on the first switch the second call to the primary telephone line;

(j) sending a second query from the first switch to the service control point in response to the second call;

(k) sending a second response message from the service control point to the first switch wherein said second response provides a first telephone number selected from the plurality of telephone numbers in a called party field;

(l) ringing a first telephone line associated with the first telephone number;

(m) repeating steps (h) through (l) for each telephone number in the plurality of telephone numbers;

(n) connecting the caller if one of the calls is answered; and (o) disconnecting the service node from each call made in the preceding steps.

8. The method of claim 7, wherein the plurality of subscriber telephone numbers comprises the wireline telephone number and a wireless line telephone number.

9. The method of claim 8, further comprising the steps of setting a first timer before sending the first call setup message and delaying step (i) until the first timer expires.

10. The method of claim 7, further comprising the steps of setting a first timer before sending the first call setup message and delaying step (k) until the first time expires.

11. The method of claim 7, wherein the identification code corresponds to a counter indicating an iteration of step (f).

12. A method for providing simultaneous ringing on a plurality of subscriber telephone lines, said method comprising:

(a) populating a database on a first server with a subscriber's wireline number and a plurality of subscriber telephone numbers;

(b) forwarding to a second server a caller's telephone call when the telephone call is placed to the subscriber's wireline number;

(c) sending a call setup message from the second server to a switch, wherein said call setup message has the wireline number in a called party field and an identification code in a redirecting party field;

(d) querying the database for the wireline number and a telephone number selected from the plurality of subscriber telephone numbers based on the identification code;

(e) inserting the selected telephone number into the called party field;

(f) ringing a customer premises device associated with the selected telephone number;

(g) updating the identification code;

(h) repeating steps (c) through (f) for each telephone number in the plurality of subscriber telephone numbers;

(i) connecting the caller if one of the plurality of subscriber telephone lines is answered; and (j) disconnecting the second server from each call made in the preceding steps.

13. The method of claim 12, wherein the plurality of subscriber telephone numbers comprises at least one wireless line number.

14. The method of claim 12, further comprising the steps of setting a first timer before sending the call setup message and delaying step (g) until the first timer expires.

15. The method of claim 12, further comprising the steps of setting a first timer before sending the call setup message and delaying step (j) until the first timer expires if none of the plurality of subscriber telephone lines are answered.

16. The method of claim 12, wherein the identification code corresponds to a counter indicating an iteration of step (g).

17. A system providing simultaneous ringing on a plurality of subscriber telephone lines, said system comprising:
- (a) a service control point comprising a database including a subscriber's wireline number and a plurality of subscriber telephone numbers;
- (b) a first switch in communication with the service control point, wherein the first switch comprises a first trigger on the subscriber's wireline number;
- (c) a second switch in communication with the service control point, the first switch and a compact service node, wherein when a call encounters the first trigger, the call is forwarded to the compact service node, and the compact service node sends a first call setup message to the second switch, wherein the first call setup message has the subscriber's wireline number in a called party field and a first identification code in a redirecting party field, and wherein the first call setup message encounters a second trigger on the second switch, wherein the second switch sends a query to the service control point, wherein in response to the query the service control point queries the database for the subscriber's wireline number and selects a telephone number from the plurality of subscriber telephone numbers based on the first identification code, wherein the service control point inserts the selected telephone number into the called party field of a response message and sends the response message to the second switch, wherein the second switch rings a customer premises device associated with the selected telephone number, and wherein the compact service node updates the identification code and repeats sends a second call setup message to the second switch, wherein the second call setup message has the subscriber's wireline number in the called party field and a second identification code in the redirecting party field.

18. The system of claim 17, wherein the plurality of subscriber telephone numbers comprises at least one wireless line number.

19. The system of claim 17, wherein the identification code corresponds to a counter indicating when a call setup message has been sent from the compact service node to the second switch.

20. The system of claim 17, wherein the first switch and the second switch comprise the same switch.

21. The system of claim 17, further comprising a plurality of signaling links connecting the first and second switches and the service control point to a signaling network.

22. The system of claim 21, wherein the signaling network comprises a common channel signaling system number 7 network.

23. The system of claim 17, further comprising a mobile switching center in communication with the service control point and the first and second switches, said mobile switching center logically connected to one of the plurality of subscriber telephone numbers.

* * * * *